US007262362B2

(12) United States Patent
Holaus et al.

(10) Patent No.: US 7,262,362 B2
(45) Date of Patent: Aug. 28, 2007

(54) HIGH VOLTAGE DEVICE WITH A PARTICLE TRAP

(75) Inventors: Walter Holaus, Zurich (CH); Bojan Pavlovic, Zurich (CH); Miguel Garcia, Dubendorf (CH); Daniel Bleiker, Zurich (CH); Diego Sologuren-Sanchez, Wettingen (CH)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 11/066,141

(22) Filed: Feb. 25, 2005

(65) Prior Publication Data

US 2005/0189324 A1 Sep. 1, 2005

(30) Foreign Application Priority Data

Feb. 27, 2004 (EP) .................................. 04405115

(51) Int. Cl.
*H02G 1/00* (2006.01)

(52) U.S. Cl. ............................ 174/14 R; 218/7; 218/3; 218/4; 218/12; 218/13; 218/154; 218/155; 218/134; 218/139; 218/138

(58) Field of Classification Search .............. 174/14 R; 218/7, 3, 4, 12, 13, 154, 155, 134, 139, 138
See application file for complete search history.

(56) References Cited

U.S. PATENT DOCUMENTS 4,219,366 A 8/1980 Dixon
6,307,172 B1 10/2001 Bolin et al.
2002/0070199 A1* 6/2002 Ogawa et al. ................. 218/7
2002/0104827 A1 8/2002 Rokunohe et al.

FOREIGN PATENT DOCUMENTS

DE 41 20 309 A1 12/1992
EP 0 776 021 A2 5/1997

* cited by examiner

*Primary Examiner*—Jinhee Lee
(74) *Attorney, Agent, or Firm*—Buchanan Ingersoll & Rooney PC

(57) ABSTRACT

The high-voltage switching device used in one installation position and has metallic encapsulation (10) a switching gap (4) and a particle trap (1) for holding foreign body particles (2), and is characterized in that in the one installation position, the particle trap (1) is arranged vertically underneath the switching gap (4), in the one installation position, an isolator part (8) is provided, which has a surface (8*a*) aligned essentially horizontally and faces the interior of the high-voltage switching device, with a metallic wall (9), which is higher than the particle trap (1; 1'), being arranged between the isolator part (8) and the particle trap (1; 1'). The particle trap (1) has a viewing window (3). If the high-voltage switching device is a disconnector, this viewing window (3) may be identical to the viewing window (3) for visual access to the visible disconnecting gap (4) of the disconnector. The high-voltage switching device is used particularly advantageously in a second installation position and has a second particle trap, with the second particle trap arranged vertically underneath the switching gap (4) in the second installation position. This results in the high-voltage switching device having good operational reliability and a low susceptibility to defects.

15 Claims, 3 Drawing Sheets

HIGH VOLTAGE DEVICE WITH A PARTICLE TRAP

RELATED APPLICATION

The present application claims priority under 35 U.S.C. 119 to European Application No. 04405115.9 filed Feb. 27, 2004, the contents of which are hereby incorporated by reference in their entirety.

BACKGROUND

1. Technical Field

The invention relates to the field of high-voltage switch technology. It relates to a high-voltage switching device and to a method for separation of foreign body particles in a high-voltage switching device as claimed in the precharacterizing clause of the independent claims, and to a high-voltage installation as claimed in claim 10.

2. Prior Art

A high-voltage switching device such as this is known, for example, from DE 41 20 309, which describes a particle trap which is in the form of a connecting stub that is closed by a cover and whose inside is provided with a protective coating. A particle trap such as this is intended for use in high-voltage switching devices which have grounded, metallic encapsulation enclosing a live active part. Foreign body particles which are located within the encapsulation and can reduce the dielectric strength of the high-voltage switching device are intended to be collected within the particle trap. The foreign body particles which have been separated in this way are intended to remain within the particle trap, so that this results in the high-voltage switching device having a sufficiently high dielectric strength which is not reduced by these foreign body particles.

A high-voltage switching device such as this has the disadvantage that its dielectric strength and hence its operational reliability are not ensured well during operation.

SUMMARY

One object of the invention is therefore to provide a high-voltage switching device of the type mentioned initially which does not have the disadvantages mentioned above. One particular aim is to provide a high-voltage switching device which has high operational reliability.

This object is achieved by an apparatus and a method having the features of the independent patent claims.

The high-voltage switching device according to the invention, which can be used in at least one installation position and has metallic encapsulation, containing a switching gap and a particle trap for holding foreign body particles, is characterized in that in the at least one installation position, the particle trap is arranged vertically underneath the switching gap, and in that, in the at least one installation position, an isolator part is provided, which has a surface that is aligned essentially horizontally and faces the interior of the high-voltage switching device, with a metallic wall, which is higher than the particle trap, being arranged between the isolator part and the particle trap.

This results in the high-voltage switching device having high operational reliability and little susceptibility to defects. The probability of faults and flashovers is reduced.

An isolator part such as this may have the object of supporting the active part or parts of it and/or of isolating the internal volume of the high-voltage switching device from the internal volume of an adjacent component. Isolator parts in high-voltage switching devices are subject to high dielectric loads and are thus particularly sensitive to faults. An isolator part having a surface which is aligned essentially horizontally and faces the interior of the switching device is particularly susceptible to foreign body particles which are arranged on the surface.

A metallic wall or an electrically conductive projection between the isolator part and the particle trap can, on the one hand, prevent foreign body particles which land on the particle trap side from moving in the direction of the isolator part, while on the other hand ensuring that there is a low electrical field strength in the area of the particle trap.

The foreign body particles which can interfere with the dielectric strength within a high-voltage switching device include electrically conductive and non-conductive particles. Particles such as these arise, for example, during the production of the high-voltage switching device and must be removed as completely as possible from the interior of the encapsulation before the high-voltage switching device is closed and used. Foreign body particles can also enter whenever the high-voltage switching device is opened and closed. In particular, however, foreign body particles can also arise during operation of the high-voltage switching device. In general, a high-voltage switching device has at least one moving contact piece which forms a detachable contact with a further contact piece. The wear which occurs as a result of movement of the moving contact piece means that foreign body particles can be produced. In particular, a particularly large number of foreign body particles are thus produced in switching gaps as a result of the friction between the contact pieces. A particularly large number of foreign body particles are also produced when an arc is formed in the switching gap. If the field strength is sufficiently high, foreign body particles can be moved by the forces which are produced by the electrical field and act on the foreign body particles, thus leading to flashovers, particularly at points which are subject to particularly high dielectric loads.

Gravitation results in the foreign body particles that are produced in this way preferably moving downwards (in particular when switching takes place with no voltage), and thus preferably land vertically underneath the switching gap. A particle trap arranged there can hold these foreign body particles (and thus a particularly large number of foreign body particles), thus improving the operational reliability of the high-voltage switching device.

For the purposes of this application, high-voltage switching devices include high-voltage and high-power switches, switches with or without arc quenching, disconnectors, grounding devices as well as further switching devices from the field of high-voltage technology.

A high-voltage switching device such as this may be intended for use in one or more installation positions. The location of the particle trap according to the invention therefore depends on the installation position or positions.

A particle trap advantageously always contains an area which is subject to little dielectric load such that foreign body particles can no longer leave the particle trap during operation of the high-voltage switching device. The particle trap is advantageously designed in the form of a vessel, thus making it harder for the foreign body particles to leave the particle trap during operation of the high-voltage switching device. A particle trap advantageously contains a metallically surrounding area with a depression.

The electrical field strength in the particle trap should advantageously be lower, typically by two orders of magnitude and advantageously by three or more orders of magnitude, than the electrical field strength in areas within the encapsulation which are subject to severe dielectric loads. This ensures reliable separation of the foreign body particles, even during switching processes. The electrical field strength in the particle trap is preferably less than 10 kV/cm.

In one advantageous embodiment, the particle trap contains a viewing window. The viewing window allows an optical check of the presence, the nature and the quantity of foreign body particles during operation. This visual check can be used in order to identify or to confirm the need for maintenance or servicing without having to open the encapsulation of the high-voltage switching device.

In one advantageous embodiment, the high-voltage switching device can be used in at least one second installation position and has a second particle trap, with the second particle trap being arranged vertically underneath the switching gap in the at least one second installation position.

This results in greater flexibility for use of the high-voltage switching device, and high operational reliability in the second installation position of the high-voltage switching device, as well.

In the situation in which the high-voltage switching device has two or more switching gaps, the second particle trap can also be arranged vertically underneath another switching gap and, in particular, one particle trap may also in each case be provided for each switching gap and for each installation position, in which case some of these particle traps may also be identical.

One of the particle traps may advantageously be formed essentially by a contact tulip, in particular a fixed contact tulip, in the high-voltage switching device. This is advantageous because the fixed contact tulip is naturally directly adjacent to the switching gap, so that particles which are produced there are trapped at the point at which they occur. Furthermore, the contact tulip forms a Faraday cage, so that there is no field in the internal area surrounded by the contact tulip.

In one advantageous embodiment, the high-voltage switching device is a disconnector, in particular a disconnector with a contact tube as the moving contact, and advantageously with a visible disconnecting gap as the switching gap. The high-voltage switching device may also be a grounding device or a disconnector which acts as a grounding device and whose grounding device disconnecting gap represents the switching gap. It is particularly advantageous for the high-voltage switching device to be a disconnector/grounding device with a disconnecting gap on the ground side and a disconnecting gap on the high-voltage side.

The or one of the particle traps may advantageously be formed essentially by an opening for holding the contact tube of the disconnector or grounding device disconnector. This is advantageous because the opening is naturally directly adjacent to the switching gap, so that particles which are produced there are trapped directly at the point at which they occur. Furthermore, the opening may essentially form the interior of a Faraday cage, so that there is no field in the opening.

A viewing window in the particle trap can advantageously at the same time be in the form of a viewing window for visual access to a visible disconnecting gap. In this case, the functions of the viewing window are on the one hand to make the visible disconnecting gap visually accessible, and on the other hand to make the particle trap and the foreign body particles in it visually accessible. This dual function of the viewing window simplifies the design of the high-voltage switching device. In comparison to the standard vertical alignment of the viewing window for visual access to a visible disconnecting gap, a horizontal alignment of the viewing window, which is advantageous for particle assessment, takes account of the disadvantage of generally poorer accessibility of the viewing window for someone looking through the viewing window.

In one preferred embodiment, the high-voltage switching device is a disconnector/grounding device with a disconnecting gap on the ground side and a disconnecting gap on the high-voltage side, which has a contact tube and can be used in at least one first, one second and one third installation position, with

- a first particle trap which contains a viewing window being arranged vertically underneath one of the disconnecting gaps in the first installation position,
- a second particle trap, which is formed essentially by a fixed contact tulip in the high-voltage switching device, being arranged vertically underneath one of the disconnecting gaps in the second installation position, and
- a third particle trap, which is formed essentially by an opening for holding the contact tube, being arranged vertically underneath one of the disconnecting gaps in the third installation position.

A high-voltage switching device such as this can be used in a highly flexible manner since it has at least three installation positions and is nevertheless highly operationally reliable by virtue of the respective particle traps.

A high-voltage switching device according to the invention may be part of a high-voltage installation according to the invention.

The method according to the invention for separation of foreign body particles in a high-voltage switching device which can be used in at least one installation position and has a switching gap and a particle trap for holding the foreign body particles is characterized in that the foreign body particles are separated in a particle trap which is arranged vertically underneath the switching gap in the at least one installation position, with an isolator part having a surface which is aligned essentially horizontally and faces the interior of the high-voltage switching device being provided in the at least one installation position, and with a metallic wall, which is higher than the particle trap, being arranged between the isolator part and the particle trap.

The other advantageous methods according to the invention result from the advantageous apparatuses according to the invention.

Further preferred embodiments and advantages will become evident from the dependent patent claims and from the figures.

BRIEF DESCRIPTION OF THE DRAWINGS

The subject matter of the invention will be explained in more detail in the following text with reference to preferred exemplary embodiments which are illustrated in the attached drawings in which, schematically and in the form of sections.

Figure 1:
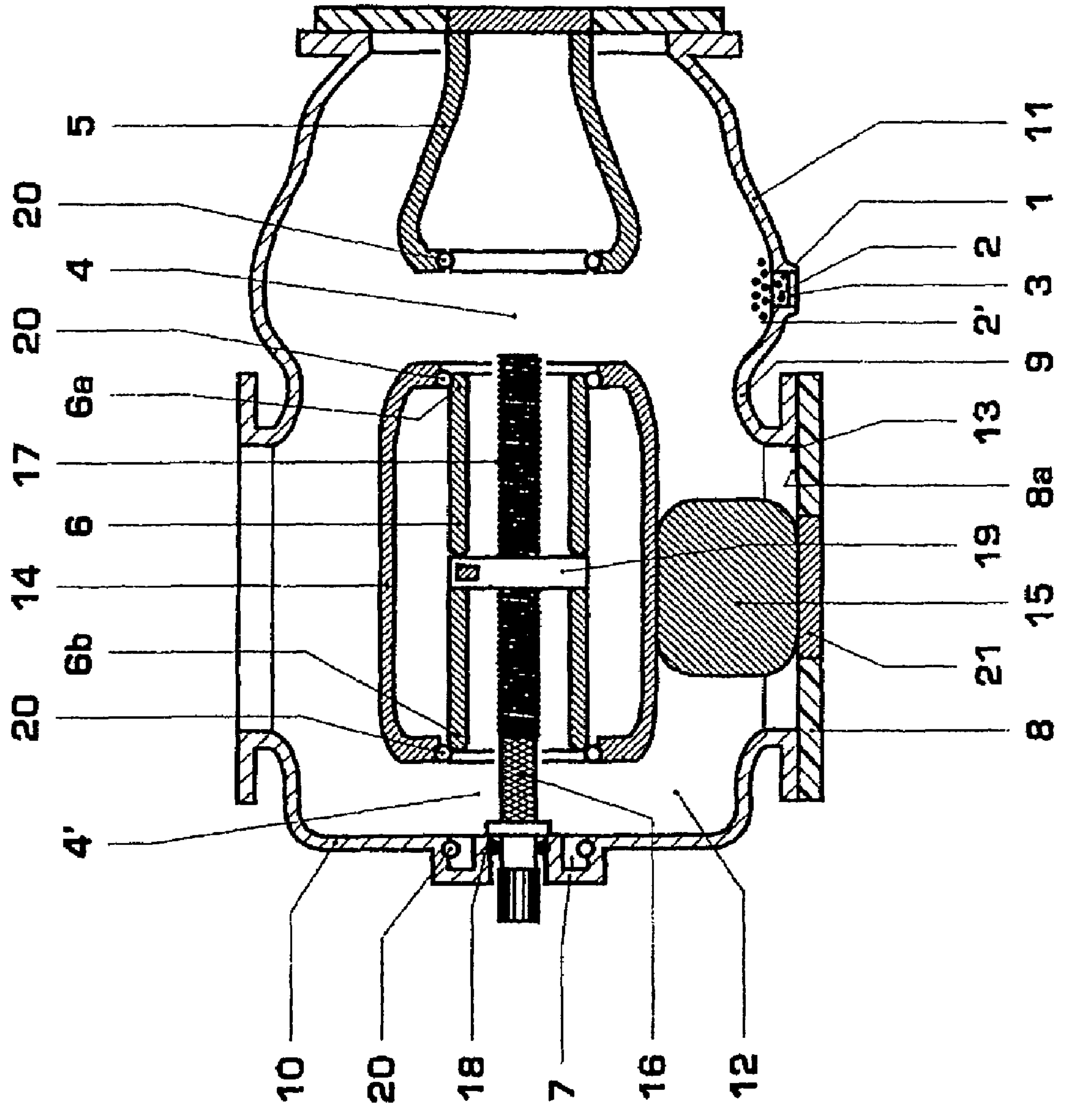
FIG. 1 shows a grounding device/disconnector according to the invention in a first installation position.

The reference symbols used in the drawings, and their meanings, are listed in summarized form in the List of Reference Symbols. In principle, identical parts and parts having the same effect are provided with the same reference symbols in the figures. The described exemplary embodiments represent examples of the subject matter of the invention and have no restrictive effect.

DETAILED DESCRIPTION

Figure 2:
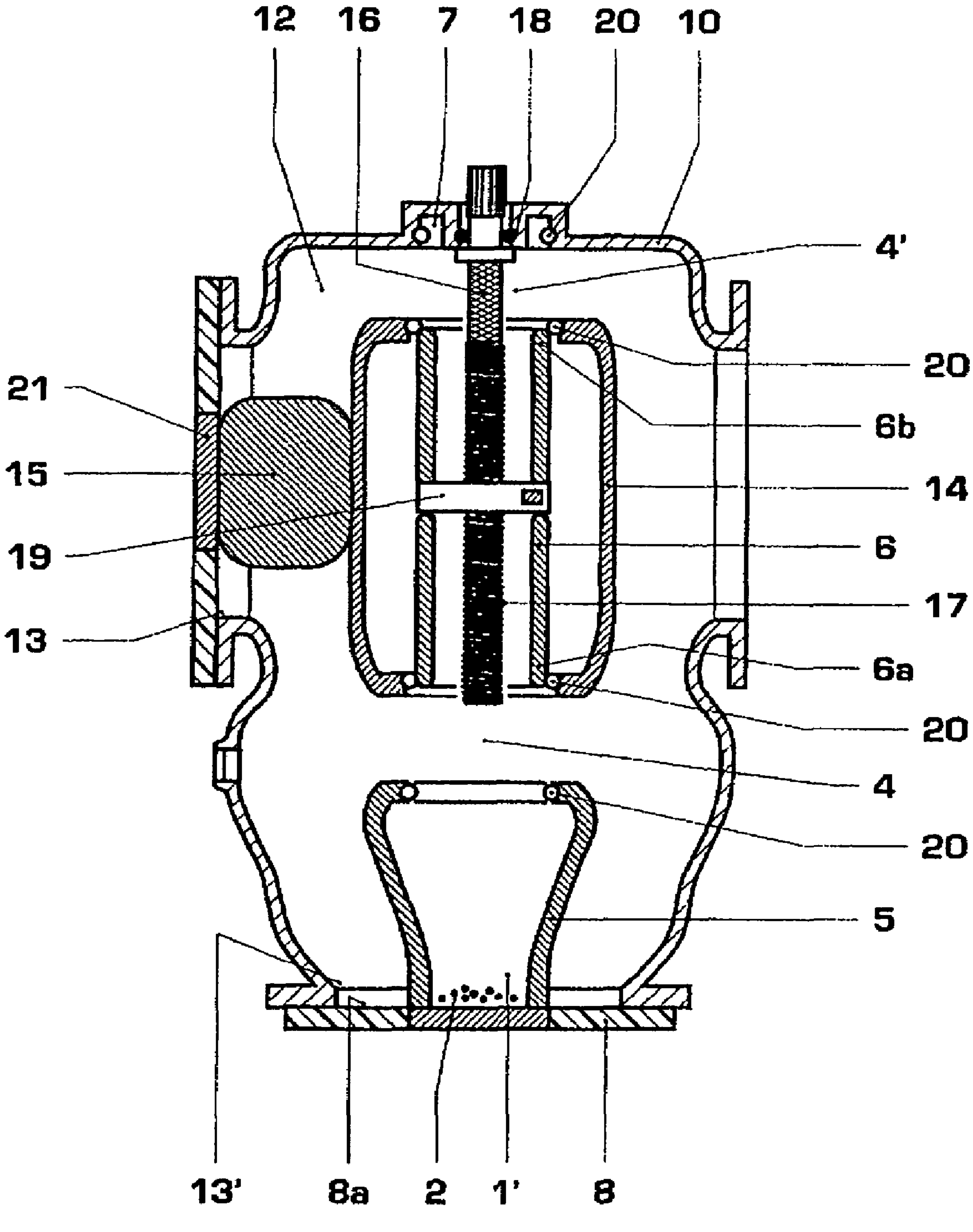
FIG. 2 shows the grounding device/disconnector according to the invention from FIG. 1 in a second installation position.
Figure 3:
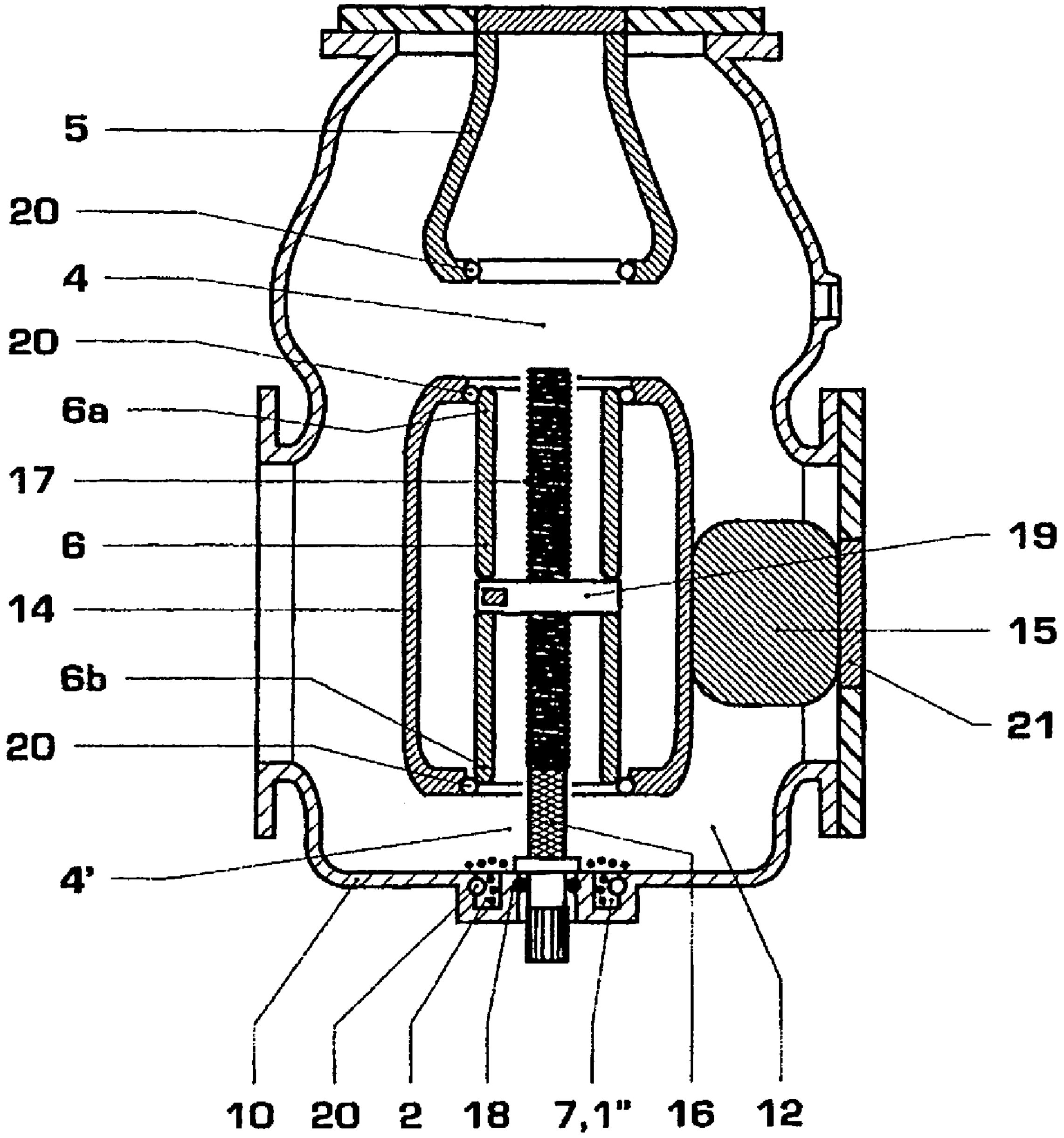
FIG. 3 shows the grounding device/disconnector according to the invention from FIG. 1 in a third installation position.

FIG. 1 shows a grounding device/disconnector according to the invention in a first installation position. This grounding device/disconnector can also be used in at least two other installation positions, which are illustrated in FIGS. 2 and 3.

The grounding device/disconnector has metal encapsulation 10 which is filled with an insulating gas 12, preferably $SF_6$. Alternatively, there could also be a vacuum within the encapsulation 10. Furthermore, the encapsulation 10 contains active parts, which are supported on an isolator part 8. A connecting piece 15 which is supported on a metal part 21 (internal fitting in the isolator part 8) which is provided in the isolator part 8 produces an electrical connection between the active part and the exterior. The connecting piece 15 supports a contact tube mount 14 to which a contact tube 6 is fitted which makes contact with the contact tube mount 14 by means of a spiral spring contact 20. The contact tube can be moved between three positions by means of a traveling nut 19 and a spindle 17 which is guided by means of a spindle guide 18. A different moving contact piece, for example in the form of a complete cylinder, could also be used instead of the contact tube. The spindle has an insulating shaft 16 in order to electrically isolate the traveling nut 19 from the encapsulation 10.

When the grounding device/disconnector is in a grounding position, an end 6*b* of the contact tube 6 on the ground side is held in an opening 7, and produces an electrical connection via spiral contacts 20 between the grounded encapsulation 10 and the metal part 21. An isolating gap 4' on the ground side is thus bridged, while an isolating gap 4 on the high-voltage side is open. The opening 7 for holding the contact tube 10 is integrated in the encapsulation in FIG. 1; other embodiments of the opening 7 are possible.

When the grounding device/disconnector is in a high-voltage position, a contact is formed between a contact tulip 5, to which high voltage is applied, and the metal part 21, by an end 6*a* of the contact tube 10 on the high-voltage side making contact with the contact tulip 5 by means of spiral spring contacts 20.

In the intermediate position illustrated in FIG. 1, the contact tube 10 does not make contact with either the ground side or the high-voltage side of the grounding device/disconnector.

For further details relating to the design and operation of the described grounding device/disconnector, reference should be made to the patent application by the inventors Daniel Bleiker, Bojan Pavlovic, Diego Sologuren, Walter Holaus and Martin Wieser from the same applicant, which was submitted to the European Patent Office on the same date as the present patent application and is entitled "Schaltgerät mit Trenn-und/oder Erderfunktion" [Switching device with a disconnecting and/or grounding device function].

The described grounding device/disconnector has a particle trap, which is arranged vertically underneath the disconnector gap 4, for each of its three installation positions (see FIGS. 1, 2, 3), with one particle trap being arranged both vertically underneath the disconnector gap 4 and vertically underneath the disconnector gap 4' in each of the installation positions illustrated in FIGS. 2 and 3. An additional particle trap could be provided for the disconnecting gap 4' on the ground side, for the installation position illustrated in FIG. 1 (not illustrated).

In FIG. 1, the particle trap is formed by a vertically aligned approximately cylindrical opening in the encapsulation 10, and a viewing window 3. The viewing window 3 is advantageously at the same time used as a viewing window for visual access to the optical disconnecting gap 4. A number of foreign body particles 2 are illustrated within the particle trap 1, and a number of foreign body particles 2' are illustrated close to the particle trap 1. Owing to the geometry of the particle trap 1, the field strengths and dielectric load within the particle trap 1 are very low.

A metallic wall 9, which is formed by the encapsulation 10, is formed between the particle trap 1 and the horizontally aligned isolator part 8. The particle trap 1 is located within an outward bulge 11 on the encapsulation 10. The outward bulge 11 reduces the electrical field strength in the area of the particle trap 1. The wall 9 makes it virtually impossible, or at least more difficult, for foreign body particles 2' on the side of the wall 9 facing the particle trap 1 to move in the direction of the isolating part 8 and to reach a surface 8*a* of the isolating part 8 facing the interior of the grounding device/disconnector, thus resulting in the grounding device/disconnector having high operational reliability. The outward bulge 11 and the wall 9 may alternatively also be interpreted as components of the particle trap 1.

Particularly highly dielectrically loaded points in a high-voltage switching device are triple points such as the triple point 13, which is formed by the isolating part 8, the encapsulation 10 and the insulating gas 12. Foreign body particles located there are particularly dangerous to the dielectric strength of the high-voltage switching device. A wall such as the wall 9 in FIG. 1 is therefore highly advantageously arranged between the triple point 13 and the particle trap 1 arranged underneath the disconnecting gap 4.

In FIG. 1, the grounding device/disconnector is aligned such that the contact tube 6 moves horizontally during a switching process. The contact tube 6 can move vertically in the installation positions illustrated in FIGS. 2 and 3.

The contact tulip 5 is used essentially as a particle trap 1' arranged vertically underneath the two disconnecting gaps 4, 4' in the installation position illustrated in FIG. 2. This contact tulip 5 represents a metallic container in which foreign body particles 2 are held safely, since the electrical field within the contact tulip 5 is negligibly small, and the contact tulip 5 at the same time represents a high wall, which is virtually insurmountable, for the foreign body particles 2. The bottom face of the contact tulip is closed and is screwed to a metallic internal fitting in the isolator part.

FIG. 3 illustrates the grounding device/disconnector in a third installation position, in which the opening 7 for holding the contact tube 6 is used as a particle trap 1" arranged vertically underneath the two disconnecting gaps 4, 4'. The opening 7 is essentially in the form of a ring. Since it is provided in the encapsulation 10, it offers a metallic surround for foreign body particles 2, so that foreign body particles 2 within the particle trap 1" are subject to only low field strengths, and thus are reliably held there.

The particle trap 1, 1', 1" is advantageously arranged centrally underneath the (respective) disconnecting gap. In the case of a horizontally running disconnecting gap (as in FIG. 1), it may extend over the entire length of the disconnecting gap 4 or may have an even greater width or, as in FIG. 1, may have a narrower width, with an outward bulge 11 highly advantageously being provided in the latter case, which extends over at least the entire extent of the disconnecting gap 4 in the horizontal direction.

In the case of vertically running disconnecting gaps (FIGS. 2 and 3), the particle trap advantageously extends over at least the entire horizontal extent of the contact points (in this case: on the spiral contact 20), so that the foreign body particles which are produced during switching processes as a result of wear or possibly as a result of an arc and which fall essentially vertically downwards reliably land in the particle trap. This is the case with the particle traps 1, 1" in FIGS. 2 and 3, respectively.

List of Reference Symbols

1, 1', 1" Particle trap
2, 2' Foreign body particles
3 Viewing window
4 Switching gap, disconnecting gap on the high-voltage side, visible disconnecting gap
4' Switching gap, disconnecting gap on the ground side, ground gap
5 Contact tulip
6 Contact tube, moving contact piece
**6*a*** End of the contact tube on the high-voltage side
**6*b*** End of the contact tube on the ground side
7 Opening for holding the contact tube
8 Isolator part
**8*a*** Surface
9 Metallic wall
10 Encapsulation
11 Outward bulge, trough
12 Insulating gas, $SF_6$
13, 13' Triple point
14 Contact tube mount
15 Connecting piece
16 Isolating shaft
17 Spindle
18 Spindle guide
19 Traveling nut
20 Spiral spring contact
21 Metal part, internal fitting in the isolator part

The invention claimed is:

1. A high-voltage switching device which can be used in at least a first installation position, comprising:

a metallic encapsulation having a switching gap and a first particle trap for holding foreign body particles, a contact piece being movable horizontally in the first installation position, the particle trap being arranged underneath at least a section of the switching gap in the first installation position;

an isolator part having a surface that is aligned horizontally and faces the interior of the high-voltage switching device in the first installation position; and a metallic wall, which is formed by the encapsulation and is higher than the particle trap and higher than the surface of the isolator part being formed between the isolator part and the particle trap.

2. The high-voltage switching device as claimed in claim 1, wherein the particle trap contains a viewing window, which has in the first installation position a horizontal alignment for particle assessment.

3. The high-voltage switching device as claimed in claim 1, wherein the high-voltage switching device can be used in at least one second installation position, in which the contact piece is movable vertically, and has a second particle trap, with the second particle trap being arranged underneath the switching gap in the at least one second installation position.

4. The high-voltage switching device as claimed in claim 3, wherein the second particle trap is formed by a contact tulip of the high-voltage switching device.

5. The high-voltage switching device as claimed in claim 1, wherein the high-voltage switching device is a disconnector with a moving contact piece and with a visible disconnecting gap as the switching gap.

6. The high-voltage switching device as claimed in claim 1, wherein the particle trap is located within an outward bulge of the encapsulation.

7. The high-voltage switching device as claimed in claim 1, wherein the particle trap extends over the entire length of the disconnecting gap or has a narrower width with an outward bulge being provided, which outward bulge extends over at least the entire extent of the disconnecting gap in the horizontal direction.

8. The high-voltage switching device as claimed in claim 1, wherein the particle trap is designed in the form of a vessel.

9. The high-voltage switching device as claimed in claim 2, wherein the particle trap is formed by a vertically aligned approximately cylindrical opening in the encapsulation, and by the viewing window.

10. The high-voltage switching device as claimed in claim 2 wherein the viewing window in the particle trap is at the same time in the form of a viewing window for visual access to a visible disconnecting gap.

11. The high-voltage switching device as claimed in claim 5, wherein the disconnector is a disconnector/grounding device with a disconnecting gap on the ground side and a disconnecting gap on the high-voltage side.

12. The high-voltage switching device as claimed in claim 4, wherein the high-voltage switching device is a disconnector/grounding device with a disconnecting gap on the ground side and a disconnecting gap on the high-voltage side, which device has a moving contact piece and can be used in the at least one first and one second and in at least one third installation position, wherein in the third installation position, the contact piece is moveable vertically, a third particle trap, which is formed by an opening for holding the moving contact tube, being arranged vertically underneath one of the disconnecting gaps in the third installation position.

13. A high-voltage installation, wherein the installation has at least one high-voltage switching device as claimed in claim 1.

14. A high-voltage switching device which can be used in at least one first installation position, comprising:

a metallic encapsulation having a switching gap and a first particle trap for holding foreign body particles, a contact piece being movable horizontally in the first installation position, the particle trap being arranged underneath at least a section of the switching gap in the first installation position;

an isolator part having a surface that is aligned horizontally and faces the interior of the high-voltage switching device in the first installation position;

a metallic wall, which is formed by the encapsulation and is higher than the particle trap and higher than the surface of the isolator part being formed between the isolator part and the particle trap; and the particle trap being located within an outward bulge of the encapsulation.

15. A high-voltage switching device which can be used in at least one first installation position, comprising:

a metallic encapsulation having a switching gap and a first particle trap for holding foreign body particles, a contact piece being movable horizontally in the first installation position, the particle trap being arranged underneath at least a section of the switching gap in the first installation position;

an isolator part having a surface that is aligned horizontally and faces the interior of the high-voltage switching device in the first installation position;

a metallic wall, which is formed by the encapsulation and is higher than the particle trap and higher than the surface of the isolator part being formed between the isolator part and the particle trap;

wherein the particle trap extends over the entire length of the disconnecting gap or has a narrower width with an outward bulge being provided, which outward bulge extends over at least the entire extent of the disconnecting gap in the horizontal direction.

* * * * *